Oct. 11, 1966  P. LÜSCHER  3,277,813
ELECTRIC APPARATUS FOR BAKING, GRILLING AND TOASTING
Filed April 3, 1964  2 Sheets-Sheet 1

INVENTOR.
PAUL LÜSCHER

Oct. 11, 1966 P. LÜSCHER 3,277,813
ELECTRIC APPARATUS FOR BAKING, GRILLING AND TOASTING
Filed April 3, 1964 2 Sheets-Sheet 2

INVENTOR.
PAUL LÜSCHER

United States Patent Office 3,277,813
Patented Oct. 11, 1966

3,277,813
ELECTRIC APPARATUS FOR BAKING, GRILLING AND TOASTING
Paul Lüscher, Tauffelen, Bern, Switzerland
Filed Apr. 3, 1964, Ser. No. 357,048
Claims priority, application Switzerland, Feb. 11, 1964, 1,586/64
1 Claim. (Cl. 99—391)

The present invention relates to an electric apparatus for baking, grilling and toasting and particularly for carrying out such operations on slices of bread, for example in the form of sandwiches, on small cheese cakes or fruit cakes, on slices of meat or the like.

Known apparatus of this kind do not work continuously since it is necessary to wait until the baking, grilling or toasting of the inserted articles has been finished before fresh articles can be inserted.

In order to eliminate this drawback there is provided, according to the invention, an apparatus of the kind referred to and comprising a grid for supporting the articles to be treated and electric heating elements arranged on both sides of the grid, wherein the said grid is arranged in a horizontal plane and connected to a vertical shaft, the grid and the shaft being rotatable in a casing having an opening for placing the articles onto the grid, and the electric heating elements being arranged on both sides of the grid and running parallel with it, these elements extending over the whole grid with the exception of a part thereof lying outside the opening in the casing.

In the accompanying drawing there is shown, by way of example, one preferred embodiment of the invention.

Figure 1:
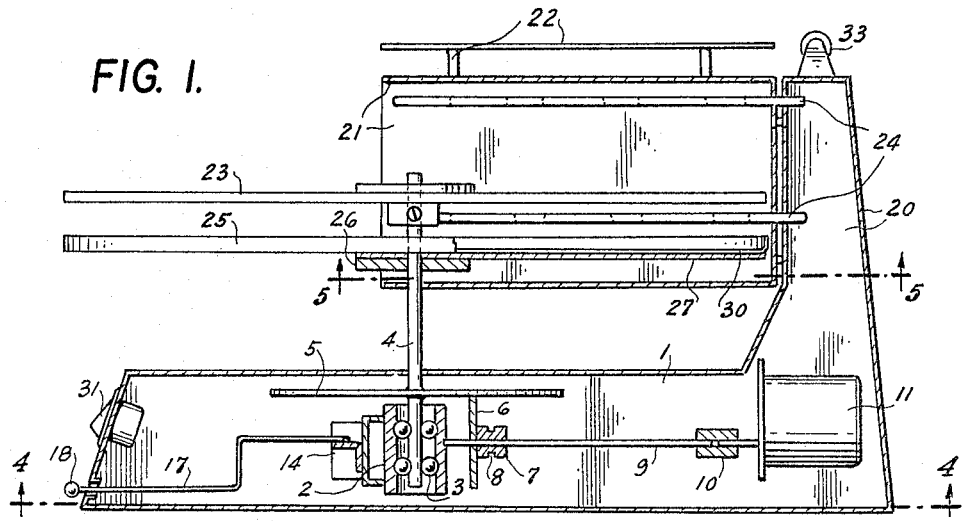
Figure 2:
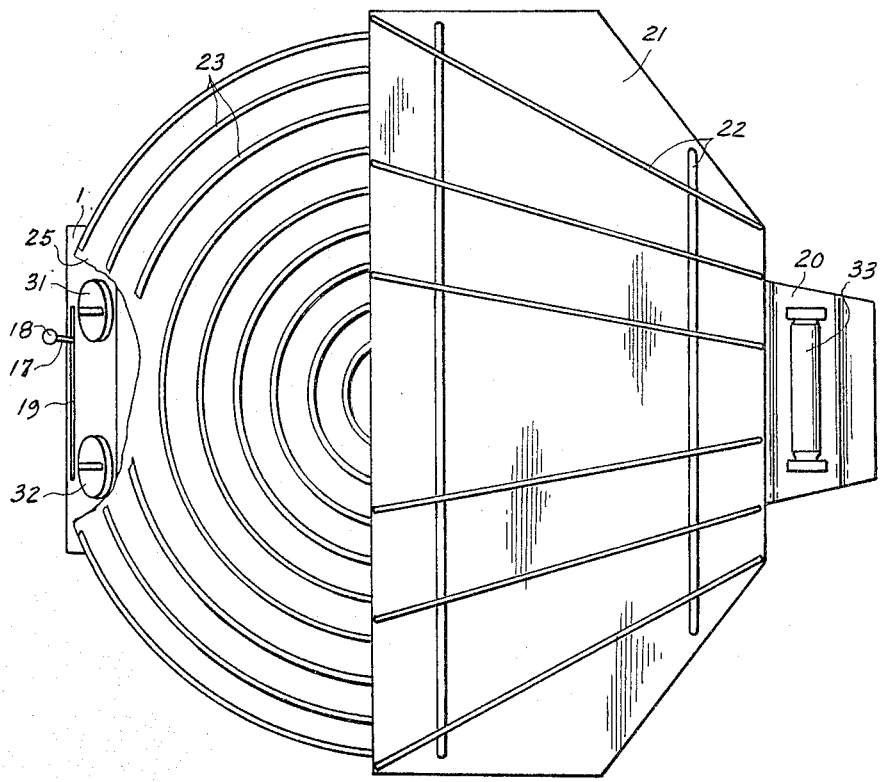
Figure 4:
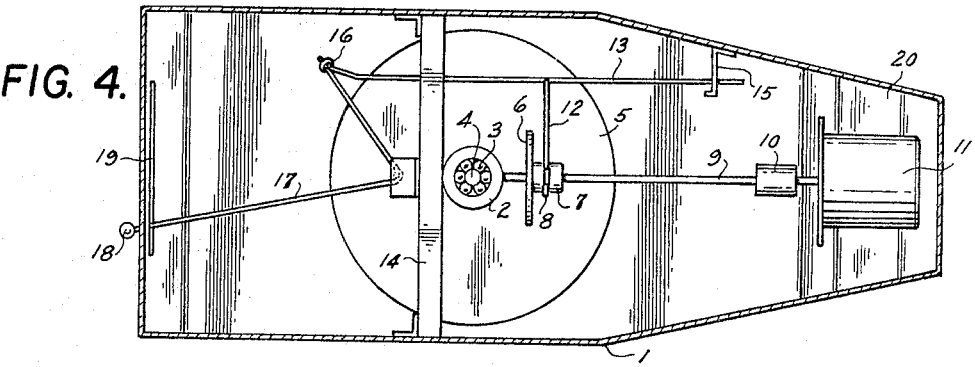
Figure 5:
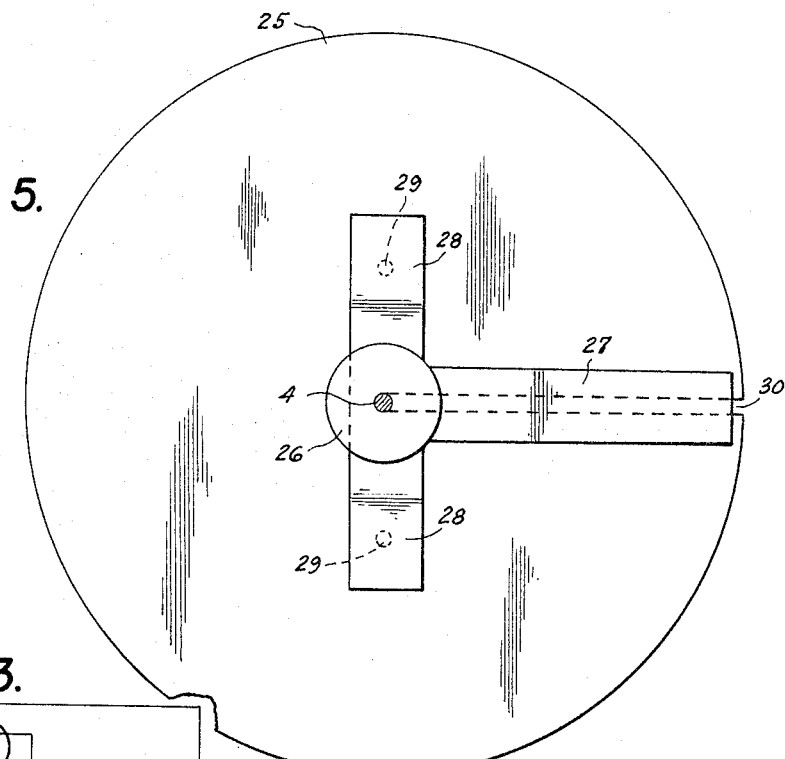
Figure 3:
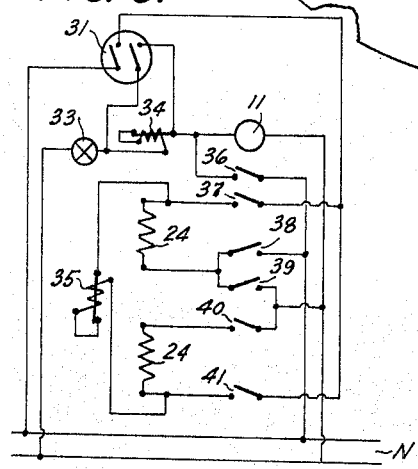

FIGURE 1 is a vertical sectional view of an apparatus according to the invention, FIGURE 2 is a top plan view of the same, shown with a grid and drip pan of the apparatus partly broken way, FIGURE 3 shows the electric wiring diagram of the apparatus, FIGURE 4 is a sectional view taken along the line 4—4 on FIGURE 1, and FIGURE 5 is a sectional view taken along the line 5—5 on FIGURE 1.

The apparatus shown in the drawing comprises a housing 1 having mounted therein a bearing 2 for a vertical shaft 4 rotatable on balls 3 in the said bearing. The shaft 4 carries a plate 5 engaging a friction disk 6 which is fixed to a bush 7 provided with a groove 8 (FIGURES 1 and 5). The friction disk can be displaced along a horizontal shaft 9 one end of which is rotatable in the bearing 2 and the other end of which is held in a coupling sleeve 10. A geared electric motor 11 is coupled to the shaft 9 by means of the coupling sleeve 10 so that the shaft 9 can be rotated, whereby the friction disk 6 causes the plate 5 to rotate and thereby also the shaft 4.

Engaging in the groove 8 of the bush 7 is an arm 12 which is secured to a rod 13 axially slidable in brackets 14 and 15 in the housing 1 (FIGURE 4). The end of the rod 13 is pivotally connected, as at 16, to one arm of a bent lever 17, the other free arm of which projects out of the housing 1 and carries an actuating knob 18. A slot 19 in the wall of the housing permits pivoting of the bent lever 17 in order to cause longitudinal displacement of the rod 13 together with the arm 12. By this displacement, the bush 7 and friction disk 6 are moved axially on shaft 9, thus adjusting the speed of rotation of the plate 5 carried on shaft 4.

At the rear end of the housing 1 a column 20 projects upwardly, and on it is fixed a casing 21. The upper side of the casing 21 carries a supporting grid 22, and the inner walls of the casing serve as reflecting surfaces.

A grid 23, axially adjustable on the shaft 4, has more than half its area within the casing 21 and located between electric heating elements 24 arranged above and below the grid 23.

These heating elements 24 are fixed to the column 20 and cover substantially the whole surface of the part of the grid 23 lying within the casing 21.

Below the grid 23 and below the lower heating element a drip pan 25 is arranged, carried on a part 26 fixed to the shaft 4. The part 26 (FIGURES 1 and 5) is provided with an arm 27 and two lateral arms 28 carrying upwardly projecting pins 29. The drip pan has a radial gap 30, allowing it to be pushed over the shaft 4. In the normal operating position this gap 30 is closed by the arm 27. The pins 29 on the arm 28 then engage in holes in the drip pan 25.

Above the slot 19 in the front wall of the housing 1 a timing switch 31 and a rotary switch actuator 32 are fitted. There is a signal lamp 33 on the column 20.

According to the electric wiring diagram shown in FIGURE 3, in addition to the switch 31 there are also a blinker switch 34, a timer 35, and switching contacts 36, 37, 38, 39, 40 and 41 which are controlled by the switch actuator 32.

When starting the operation of the apparatus by means of the switch actuator 32, the contact 36 is closed in a first position of the switch actuator 32. Current then flows through this contact from the supply lines N to the motor 11, while at the same time the signal lamp 33 receives current through the blinker switch 34 and consequently blinks. The grid 23 rotates.

In the second switching position of switch actuator 32 the contacts 36, 37, 39, 40 and 41 are closed, as are also the contacts of the timing switch 31. One of the contacts of the timing switch shunts the blinker switch 34 so that the signal lamp 33 remains permanently lighted. Through the second contact of the timing switch 31 the two heating elements 24 are connected to the supply lines N. After a certain time for which the timing switch 31 has been preset this switch opens its contacts so that the signal lamp 33 again blinks and the heating elements 24 are de-energized.

In a third switching position of the switch actuator 32 its contacts 36, 39, 40 and 41 are switched on, and the timing switch 31 has its contacts closed too. Thereby the upper heating element is energized, while the lower one receives current through the timer 35 and its winding. This timer, the setting of which may be fixed or adjustable by means of a rotary knob, switches the lower heating element off periodically, thus causing it to work with less than its full heating capacity.

In the fourth switching position of the switch actuator 32 its contacts 36, 37, 39 and 40 are closed and the timing switch 31 also has its contacts closed. Thereby the lower heating element is energized on, while the upper one is periodically deenergized by the timer.

In the last switching position of the switch actuator 32 the contacts 36, 38 and 40 are closed. The timing switch 31 is switched off so that the signal lamp 33 blinks. The heating elements 24 are connected in series across the supply lines through the winding of the timer 35. The current flowing through the heating elements serves to keep the apparatus warm, but this current is not sufficient to cause the timer 35 to operate.

The articles to be baked, grilled or toasted are placed continuously onto the accessible part of the grid 23 and, with the heating elements 24 and the motor 11 switched on, they travel through the casing, whereby they are given the desired heat treatment between the heating elements and can thereafter be taken away from the accessible part of the grid.

The speed of rotation of the shaft 4 and thereby of the grid 23 is, by adjusting the friction disk 6 with respect to the plate 5, chosen in such a way that the time taken by the articles to pass through between the heating elements is sufficient for treating them as desired until finished.

What I claim is:

An electric apparatus for baking, grilling and toasting comprising a casing having an opening at the front thereof, a rotatable shaft extending vertically in said casing substantially at the center of said front opening of the casing, a horizontal grid secured at its center on said shaft so as to have approximately one-half of said grid located within said casing and the other half of said grid projecting out of said casing, electrical heating elements located in said casing above and below said grid, electrically driven means operative to rotate said shaft and grid about the axis of said shaft, a support bracket fixed on said shaft below said grid and having two oppositely directed lateral arms and a leg extending from between said arms at right angles to the latter, a drip pan having a slot extending from the center thereof and opening at the periphery of the drip pan to receive said shaft when the drip pan is supported on said bracket with said leg underlying said slot and closing the latter, and cooperative means on said bracket and drip pan to constrain the latter to rotate with said bracket and shaft.

References Cited by the Examiner

UNITED STATES PATENTS

| | | | |
|---|---|---|---|
| 1,054,321 | 2/1913 | Sinks | 99—443 |
| 1,093,390 | 4/1914 | Foster | 74—194 X |
| 1,477,343 | 12/1923 | Griffin | 99—390 X |
| 1,543,212 | 6/1925 | Kurrell et al. | |
| 2,438,699 | 3/1948 | Groetchen | 99—423 |
| 2,646,495 | 7/1953 | Dornbush | 99—443 X |
| 2,920,177 | 1/1960 | Brane | 99—391 |

FOREIGN PATENTS 478,504    1/1938    Great Britain.

WALTER A. SCHEEL, *Primary Examiner.*

BILLY J. WILHITE, *Examiner.*